Dec. 29, 1964   G. FEICK III, ET AL   3,163,705
OIL INSULATED IMPREGNANT FOR HIGH VOLTAGE ELECTRICAL APPARATUS
Filed Aug. 21, 1959
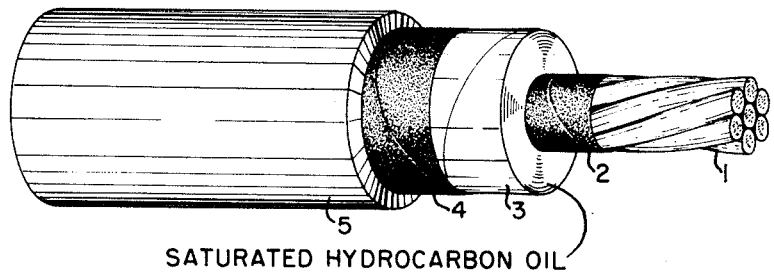
SATURATED HYDROCARBON OIL
INCORPORATING A SEC-ALKYL
SUBSTITUTED AROMATIC
INVENTORS
GEORGE FEICK III
WALTER F. OLDS
BY
Pennie, Edmonds, Morton,
Barrows and Taylor
ATTORNEYS 3,163,705
OIL INSULATED IMPREGNANT FOR HIGH
VOLTAGE ELECTRICAL APPARATUS
George Feick III, Needham, and Walter F. Olds, Arlington, Mass., assignors, by mesne assignments, to Anaconda Wire and Cable Company, Hastings on Hudson, N.Y., a corporation of Delaware
No Drawing. Filed Aug. 21, 1959, Ser. No. 835,198
3 Claims. (Cl. 174—25)

This invention relates to high voltage electrical apparatus and, more particularly, to high voltage electric power cables having a copper conductor surrounded by insulation which is impregnated with a saturated hydrocarbon cable oil. The invention provides an improved oil-impregnated electric power cable and is based on the discovery that certain sec-alkyl-substituted aromatic compounds, when incorporated in the hydrocarbon cable oil, are capable of imparting a negative gassing coefficient to the oil and of minimizing an increase in the power factor of the oil under conditions which normally result in chemical decomposition and impaired dielectric properties. The electric power cable of the invention may be operated at high voltages and over sustained periods of time without danger of oxidative degradation to the hydrocarbon oil or appreciable loss of its dielectric properties.

The formation and evolution of gaseous hydrogen and the oxidative degradation which occur in saturated hydrocarbon oils become increasingly serious as the operating voltage of oil-insulated electrical equipment, such as oil-impregnated power cables, is increased. Progressive deterioration of cable oil at high voltages acts to depreciate its insulating properties, since the oxidative degradation of the oil and the formation and evolution of gaseous hydrogen are frequently, if not invariably, accompanied by a loss in dielectric strength and a pronounced increase in the power factor of the cable.

In cable engineering, an increase in the measured power factor of the insulating oil serves under known conditions as a convenient indication of the dielectric loss in the insulation dissipated by heat. Therefore, it is customary to refer to the power factor of the oil because, when all characteristics of an alternating current circuit except power factor remain constant, then any increase in the power factor can only be ascribed to the consumption of power in the insulation by dielectric absorption. Consequently, changes in the power factor may be used as a direct indication of the efficiency of the insulation as a dielectric. In the case of oil-impregnated power cables operating at a constant high voltage, deterioration of the insulation is due for the most part to the formation and evolution of gas as well as to the oxidative degradation of the cable oil, both of which are reflected by an increase in the power factor of the oil.

The formation and evolution of gaseous hydrogen in a saturated hydrocarbon cable oil (or an oil which possesses no aromaticity) are believed to be caused by the homolytic scission of the C—H bonds in the paraffin, cycloparaffin or isoparaffin molecules under conditions of high electrical stress, thereby generating monatomic hydrogen free-radicals which combine to form vacuoles or pockets of gaseous (diatomic) hydrogen with the liberation of considerable thermal energy. At the high field intensities which occur in high voltage cables, gas in these vacuoles becomes ionized, increasing the electrical stress in the adjacent dielectric and so promoting their own enlargement or the development of more similar vacuoles along a path through which a complete breakdown of the cable insulation may occur. Certain cable oils, notably those which contain a high degree of aromaticity or olefinic unsaturation, are capable of absorbing rather than evolving the gaseous products formed under high electrical stress, probably due to the reactivity of the unsaturated loci in these oils with hydrogen or hydrogen radicals. Whether or not a hydrocarbon oil evolves or absorbs gas is dependent upon its gassing coefficient, which is defined as the cubic centimeters of gas evolved (+) or absorbed (—) by the oil per hundred minutes at a temperature of 82.5° C. in a test cell containing an atmosphere of hydrogen gas, using an applied voltage of 9 kilovolts at 60 cycles per second. Cable oils which evolve gaseous hydrogen under conditions of high electrical stress have a positive gassing coefficient, while those which absorb gas under the same conditions have a negative gassing coefficient as a property of state.

Although cable oils which contain a high degree of aromaticity or unsaturation frequently possess a negative gassing coefficient, as a general rule these oils are more susceptible to oxidative degradation than the paraffinic or substantially saturated hydrocarbon oils. Whether the oxidative degradation of hydrocarbon cable oils is initiated by free radicals or whether this deterioration proceeds through an ionic mechanism is not precisely known since the addition to cable oils of various antioxidants, such as the oxidation inhibitors which function via a free radical mechanism or the peroxide decomposers which may function by a mechanism involving ions as well as free radicals, neither inhibits oxidation sufficiently nor precludes an increase in the power factor to determine the operative mechanism of oxidative degradation. It has been established, however, that no matter what the additive, the presence of small quantities of ionic copper in the cable oil, whether it is aromatic, paraffinic, isoparaffinic or naphthenic, catalyzes an appreciable rise in the power factor of the oil.

Although small quantities of ionic copper catalyze the formation of oxidative degradation products in the oil, it is generally believed that the actual increase in the power factor of the oil which results from this copper-catalyzed oxidation is probably due to the physical presence in the oil of ionic substances, since continuous removal of the ionic substances by adsorption from the oil on a highly adsorbent carbon black minimizes a decrease in the dielectric strength of the oil. To achieve this chemical and hence electrical stability, the structure of many oil-impregnated power cables contain carbon-black paper, generally in the form of carbon-black tapes. These carbon-black tapes are fabricated from wood pulp or manila rope paper to which carbon-black (colloidal carbon) has been added during the pulping so that the carbon-black is permeated throughout the fiber of the paper. The carbon-black tapes are usually applied over the copper conductor and over the insulation so that both the inner and outer insulation surfaces are in contact with the tape. In this manner, the tape adsorbs the products of oxidative degradation as they form and also shields the conductor against ionization discharges. Nonetheless, prolonged operation of such cables, especially at high voltages, is invariably accompanied by a slow but appreciable rise in the power factor of the cable oil and the formation and evolution of gaseous hydrogen.

Using a highly refined substantially saturated hydrocarbon oil in which the C—H bonds are very susceptible to homolytic scission and which has a pronounced tendency to undergo oxidation under conditions of high electrical stress, especially in the presence of ionic copper, we have discovered that by incorporating in such oil a small amount of a sec-alkyl-substituted aromatic compound having a boiling point, at atmospheric pressure, of not less than 200° C., it is possible to impart a negative gassing coefficient to the oil and to minimize any increase in the power factor of the oil when the oil is subjected to limited oxidation in the presence of copper. Electrical equipment, such as power cables, in which the insulation is impregnated with this oil may be operated at very high voltages without danger of early deterioration of its dielectric properties.

Based on these discoveries, the present invention provides an improved high voltage electric power cable in which a copper conductor is surrounded by insulation impregnated with hydrocarbon cable oil, the insulation containing a sec-alkyl-substituted aromatic compound having a boiling point, at atmospheric pressure, of not less than 200° C. in an amount sufficient to impart a negative gassing coefficient to the oil.

Power cables fabricated in accordance with the invention may be of any of the usual types, including the solid type, the oil-filled type, the gas-filled type, and the gas-pressure type. In the solid type, many layers of a thin tape of paper are applied to the conductor and the taped cable thereafter is impregnated with a blended paraffinic or naphthenic oil containing the sec-alkyl-substituted aromatic compound. The resultant oil-impregnated insulation is then encased in a lead sheath. In the oil-filled type of cable, channels inside the cable sheath are filled with the oil and kept full by connection to an oil reservoir maintained under pressure. In the gas-filled type of cable, the insulation is impregnated with oil, and after draining out excess oil, dry inert gas, which is maintained under pressure is introduced into the sheathed cable. In a gas-pressure cable, a tightly sheathed oil-insulated cable is place in a pressure-tight housing and subjected to inert gas at quite high pressure.

The sec-alkyl-substituted aromatic compounds may also be used as gassing inhibitors in oil-impregnated power cables containing carbon-black paper. Power cables containing carbon black also include the solid type of cable in which carbon-black tapes are applied over the conductor and over the paper insulation so that both the inner and outer insulation surfaces are in contact with them. The total paper thickness, including the carbon-black tapes, is the same as the specified insulation thickness in standard paper-insulated cables. The taped cable is impregnated with a substantially saturated hydrocarbon cable oil in which there is dissolved an amount of the sec-alkyl-substituted aromatic compound sufficient to impart a negative gassing coefficient to the oil, and the oil impregnated insulation then encased in a lead sheath.

Various types of hydrocarbon oils may be employed in the power cables of this invention. In general, these oils are isolated from petroleum distillates and are classified as naphthenic-base (cycloparaffinic) mineral oils, paraffinic-base (straight chain), or isoparaffinic (branched chain) hydrocarbon oils, all three of which are substantially saturated by catalytic hydrogenation prior to use as a cable oil. Although the oils may be blended with a purified rosin or with a high molecular weight polymer, such as polyisobutylene, the unblended mineral oils are preferred for most purposes since in general they are more resistant to decomposition and have better dielectric properties than the blended oils.

To illustrate the applicability of impregnating the insulation of a high voltage power cable with a hydrocarbon cable oil containing a minor amount of a sec-alkyl-substituted aromatic compound in accordance with the invention, a preferred embodiment is described below with reference to the single figure on the accompanying drawing:

The cable shown in this figure, which is a fragmentary perspective view partly broken away, is a single conductor cable having a central stranded conductor 1 surrounded throughout its entire length by a semiconducting layer 2 of carbon black paper. Both the conductor 1 and the semiconducting layer 2 surrounding it are covered by a substantially continuous concentric insulating layer 3 which is composed of many layers of helically wrapped paper tape saturated with a hydrocarbon cable oil containing a minor amount of a sec-alkyl-substituted aromatic hydrocarbon compound having a boiling point, at atmospheric pressure, of not less than 200° C. The insulating layer 3 is shielded, in turn, by an outer semiconducting layer 4 of carbon-black paper.

The hydrocarbon cable oil containing the sec-alkyl-substituted aromatic compound is impregnated into the insulating layer by immersing the wrapped conductor in a bath of the hydrocarbon cable oil in a vessel in which it can alternately be evacuated and then subjected to pressure to withdraw air and to cause the liquid to fill all voids and interstices in the porous wrapping. Thereafter a protective lead sheath 5 is extruded about the oil-impregnated wrapping throughout substantially the entire length of the cable.

Any sec-alkyl-substituted aromatic compound having a boiling point, at atmospheric pressure, of not less than 200° C. may be selected for inclusion in the cable insulation, provided the compound is capable of imparting a negative gassing coefficient to paraffinic hydrocarbon oils and is stable to oxidation by air in the presence of copper. We have obtained particularly satisfactory results, however, by using polyisopropyl-substituted aromatic compounds, such as the diisopropylbenzenes, triisopropylbenzenes, or tetraisopropylbenzenes or by using cycloalkyl-substituted aromatic compounds, such as phenylcyclohexane or β-(cyclohexyl) naphthalene, all of which have been found to impart a relatively high negative gassing coefficient to the oil and to be resistant to oxidation in the presence of copper. Table I lists a number of sec-alkyl-substituted aromatic compounds having a boiling point, at atmospheric pressure, of not less than 200° C. and which may be used as gassing inhibitors in paraffinic hydrocarbon oils in accordance with the invention.

TABLE I

*Sec-Alkyl-Substituted Aromatic Compounds* o-Diisopropylbenzene
m-Diisopropylbenzene
p-Diisopropylbenzene
1,2,4-triisopropylbenzene
1,2,4,5-tetraisopropylbenzene
1,4-diisopropylnaphthalene
Phenylcyclopentane
Phenylcyclohexane
p-Di-cyclohexyl)benzene
4-cyclohexylbiphenyl
4,4'-di(cyclohexyl)biphenyl
1,4-diphenylcyclohexane
α-Cyclohexylnaphthalene
9-cyclohexylanthracene Theoretically, the concentration of the sec-alkyl-substituted aromatic compound added to the oil is dependent upon the extent to which homolytic scission of the C—H bonds in the paraffinic molecules is expected to occur over the operating life of the cable, which, in turn, is dependent upon the maximum electrical stress which is expected to be produced during peak loads. Generally, the higher the intended operating voltages, the greater will be the expected formation of gaseous hydrogen in the cable oil. In practice, a large excess of the sec-alkyl-substituted aromatic compound is used in the cable oil. This excess may be from twofold to as high as a hundred-fold over the amount theoretically required to react with hydrogen radicals which will form over the life of the cable. Consequently, these sec-alkyl-substituted aromatic compounds may be used over a very wide range of concentrations. For most high voltage cables, and other electrical apparatus, we prefer to use the sec-alkyl-substituted aromatic compounds in an amount in the range from about 0.5 to about 20 percent by weight of the cable oil.

To illustrate the applicability of incorporating a sec-alkyl-substituted aromatic compound in a saturated hydrocarbon cable oil in accordance with the invention, Table II summarizes the maximum power factor increases which occurred when a highly refined paraffinic base mineral oil was subjected to limited oxidation (aging) in the presence of copper and various additives. In each example, the hydrocarbon oil was subjected to a concentration corresponding to 6 cc. of oxygen per 60 ml. of oil at a temperature of 85° C. for periods of time ranging up to 1143 hours. The maximum percent increase in power factor was determined. The limited oxidation or aging was conducted in the presence of copper (15 sq. in. of copper foil in 60 ml. of oil) alone and with either a polyisopropylbenzene (diisopropylbenzene or triisopropylbenzene) or a cycloalkyl-substituted aromatic compound (phenylcyclohexane).

TABLE II

*Limited Oxidation of Paraffinic-Base Hydrocarbon Oil*

| Additive | Conc. (Percent) | Hours Aged | Maximum Increase in Power Factor (Percent) |
|---|---|---|---|
| None | | 838 | 0.32 |
| Diisopropylbenzene | 10 | 997 | 0.06 |
| | 10 | 1,143 | 0.11 |
| Triisopropylbenzene | 10 | 855 | 0.05 |
| | 10 | 1,125 | 0.13 |
| Phenylcyclohexane | 2 | 838 | 0.12 |

As shown in Table II, the use of a sec-alkyl-substituted aromatic compound having a boiling point, at atmospheric pressure, of not less than 200° C. prevented an appreciable increase in the power factor even when copper was present.

In addition to minimizing an increase in the power factor of the oil under conditions of limited oxidation or aging, the use of these sec-alkyl-substituted aromatic compounds also imparts a negative gassing coefficient to the oil so that the oil absorbs rather than evolves gas when subjected to severe electrical stresses. Table III summarizes the gassing coefficients obtained when a paraffinic-base hydrocarbon oil was subjected to electrical stress in a test cell containing an atmosphere of hydrogen gas, the gassing coefficient being defined as the number of cubic centimeters of gas evolved (+) or absorbed (−) in 100 minutes at a temperature of 82.5° C. using an applied potential of 9 kilovolts at 60 cycles per second.

TABLE III

*Effect of Various Sec-Alkyl-Substituted Aromatic Compounds on the Gassing Coefficient of Paraffinic Hydrocarbon Oil*

| Additive | Concentration (Percent) | Gassing Coefficient |
|---|---|---|
| None | | +0.6 |
| Diisopropylbenzene | 10 | −3.9 |
| Triisopropylbenzene | 10 | −2.2 |
| Phenylcyclohexane | 2 | −1.0 |

A comparison of the experimental results tabulated in Tables II and III demonstrates the marked advantage of incorporating these sec-alkyl-substituted aromatic compounds in paraffinic hydrocarbon cable oils. Cables impregnated with oils containing these gassing inhibitors may be operated at very high voltages for prolonged periods of time without suffering serious deterioration of the dielectric properties.

Although the foregoing examples demonstrate the marked advantages in incorporating the sec-alkyl-substituted aromatic compounds in hydrocarbon cable oils, similar advantages are also obtained when the gassing inhibitor is employed in the insulating oils of other types of high voltage electrical apparatus, such as transformers, circuit breakers, capacitors, and bushings. For example, by incorporating a sec-alkyl-substituted aromatic compound having a boiling point, at atmospheric pressure, of not less than 200° C. (such as either a polyisopropyl-substituted aromatic compound or a cycloalkyl-substituted aromatic compound) in the hydrocarbon oil insulation surrounding the copper or aluminum conductors in a transformer, it is possible to impart a negative gassing coefficient to the oil and to minimize any increase in the power factor of the hydrocarbon oil during operation of the transformer at very high voltages. Consequently, the invention is applicable to the use of these sec-alkyl-substituted aromatic gassing inhibitors in any type of high voltage electrical apparatus in which copper conductors are surrounded by saturated hydrocarbon oil insulation.

We claim:

1. In high voltage electrical apparatus in which metallic conductors are surrounded by insulation comprising a substantially saturated hydrocarbon oil, the improvement which comprises incorporating in the oil from about 0.5 to about 20 percent by weight of a sec-alkyl-substituted aromatic hydrocarbon compound having a boiling point, at atmospheric pressure, of not less than 200° C. and selected from the group consisting of diisopropylbenzenes, triisopropylbenzenes, and tetraisopropylbenzenes, thereby imparting a negative gassing coefficient to the oil and minimizing an increase in the power factor of the oil during operation of the apparatus.

2. A high voltage electric power cable comprising a copper conductor surrounded by insulation impregnated with a hydrocarbon cable oil in which there is dissolved from about 0.5 to about 20 percent by weight of a sec-alkyl-substituted aromatic hydrocarbon compound having a boiling point, at atmospheric pressure, of not less than 200° C. and selected from the group consisting of diisopropylbenzenes, triisopropylbenzenes, and tetraisopropylbenzenes, whereby a negative gassing coefficient is imparted to the oil and an increase in the power factor of the oil during the operation of the cable is minimized.

3. In a high voltage electric power cable comprising a copper conductor insulated by layers of paper tape including at least one layer of a paper tape in which carbon black is dispersed, and in which the paper tapes are impregnated with a hydrocarbon cable oil, the improvement which comprises incorporating in the oil from about 0.5 to about 20 percent by weight of a sec-alkyl-substituted aromatic hydrocarbon compound having a boiling point, at atmospheric pressure, of not less than 200° C. and selected from the group consisting of diisopropylbenzenes, triisopropylbenzenes, and tetraisopropylbenzenes, thereby imparting a negative gassing coefficient to the oil and minimizing an increase in the power factor of the oil during operation of the cable.

References Cited in the file of this patent

UNITED STATES PATENTS

| | | |
|---|---|---|
| 1,878,509 | Michel | Sept. 20, 1932 |
| 2,087,578 | Nederbragt | July 20, 1937 |
| 2,171,855 | Levine et al. | Sept. 5, 1939 |
| 2,176,952 | Berberich | Oct. 24, 1939 |
| 2,238,637 | Gaylor | Apr. 15, 1941 |
| 2,288,373 | Smith et al. | June 30, 1942 |
| 2,315,039 | Beede | Mar. 30, 1943 |
| 2,377,630 | Hyde | June 5, 1945 |
| 2,465,900 | McBee et al. | Mar. 29, 1949 |
| 2,719,182 | Ross et al. | Sept. 27, 1955 |
| 2,813,830 | Trautman | Nov. 19, 1957 |
| 3,036,010 | Freier et al. | May 22, 1962 |